(12) United States Patent
Harter et al.

(10) Patent No.: US 10,255,606 B2
(45) Date of Patent: Apr. 9, 2019

(54) METHOD AND SYSTEM FOR AUTHENTICATING A DRIVER FOR DRIVER COMPLIANCE

(71) Applicant: J. J. KELLER & ASSOCIATES, INC., Neenah, WI (US)

(72) Inventors: Thomas C. Harter, Neenah, WI (US); Michael K. Kuphal, Greenville, WI (US); Bruce D. Lightner, La Jolla, CA (US)

(73) Assignee: J. J. KELLER & ASSOCIATES, INC., Neenah, WI (US)

( * ) Notice: Subject to any disclaimer, the term of this patent is extended or adjusted under 35 U.S.C. 154(b) by 0 days.

(21) Appl. No.: 16/114,867

(22) Filed: Aug. 28, 2018

(65) Prior Publication Data
US 2018/0365705 A1    Dec. 20, 2018

Related U.S. Application Data

(62) Division of application No. 15/484,603, filed on Apr. 11, 2017, now Pat. No. 10,108,967.

(51) Int. Cl.
| | |
|---|---|
| *G06Q 30/00* | (2012.01) |
| *H04W 4/44* | (2018.01) |
| *H04W 12/06* | (2009.01) |
| *G01S 19/07* | (2010.01) |
| *H04W 4/02* | (2018.01) |
| *H04W 4/80* | (2018.01) |

(52) U.S. Cl.
CPC ............ *G06Q 30/018* (2013.01); *G01S 19/07* (2013.01); *H04W 4/023* (2013.01); *H04W 4/44* (2018.02); *H04W 12/06* (2013.01); *H04W 4/80* (2018.02)

(58) Field of Classification Search
CPC .............................. G06Q 30/018; H04W 4/44
USPC ................................................. 340/5.8–5.85
See application file for complete search history.

(56) References Cited

U.S. PATENT DOCUMENTS

| | | | |
|---|---|---|---|
| 7,079,230 B1 | 7/2006 | McInerney et al. | |
| 7,350,707 B2 * | 4/2008 | Barkan ................ | G06Q 20/042 235/454 |
| RE43,178 E * | 2/2012 | Ghazarian ............. | G06Q 10/08 340/5.92 |
| 8,789,161 B2 * | 7/2014 | Jeal ......................... | G06F 21/12 726/5 |

(Continued)

OTHER PUBLICATIONS

Ex-Parte Quayle Action issued by the united States Patent Office for related U.S. Appl. No. 15/484,603 dated Jul. 11, 2018 (6 pages).

*Primary Examiner* — Allen T Cao
(74) *Attorney, Agent, or Firm* — Michael Best & Friedrich LLP

(57) ABSTRACT

Method and apparatus for authenticating a driver for driver compliance. A base unit including an electronic processor configured to receive an identification of a portable communication device associated with a driver, determine if the portable communication device is within a configurable distance from the base unit, compare the identification of the portable communication device with a stored identification, and authenticate the driver in response to the portable communication device associated with the driver being within a configurable distance from the base unit and based on identification of the portable communication device associated with the driver being a match with the stored identification.

9 Claims, 7 Drawing Sheets

(56) References Cited

U.S. PATENT DOCUMENTS

| | | |
|---|---|---|
| 9,064,422 B2 | 6/2015 | Mohn et al. |
| 9,376,090 B2 * | 6/2016 | Gennermann .......... B60R 25/20 |
| 9,390,628 B2 | 7/2016 | Mohn et al. |
| 2013/0046846 A1 | 2/2013 | Mason et al. |
| 2013/0304276 A1 | 11/2013 | Flies |
| 2014/0162598 A1 | 6/2014 | Villa-Real |
| 2015/0120135 A1 | 4/2015 | Lawrenson |
| 2016/0247153 A1 | 8/2016 | Lesesky |

* cited by examiner

METHOD AND SYSTEM FOR AUTHENTICATING A DRIVER FOR DRIVER COMPLIANCE

RELATED APPLICATION

This application is a divisional of U.S. patent application Ser. No. 15/484,603 filed on Apr. 11, 2017, the entire contents of which are incorporated by reference herein.

BACKGROUND

Embodiments relate to methods and systems for authenticating a driver for complying with requirements governing the operation of commercial motor vehicles.

SUMMARY

Embodiments disclosed herein provide methods and systems to automatically authenticate and identify a driver of a commercial vehicle. Currently available systems require manual input from the driver, which may be overlooked and may not be provided prior to driving the vehicle, leading to unassigned driving events. Unassigned driving events interfere with proper compliance with the requirements governing the operation of commercial motor vehicles. Embodiments disclosed minimize the number of unassigned driving periods by always identifying the driver when portable communication device associated with the driver is in close proximity to a base unit within the vehicle.

One embodiment provides a base unit. The base unit includes an electronic processor configured to receive an identification of a portable communication device associated with a driver; determine if the portable communication device is within a configurable distance from the base unit; compare the identification of the portable communication device with a stored identification; and authenticate the driver if the identification of the portable communication device is a match with the stored identification and the portable communication device is within the configurable distance from the base unit.

Another embodiment provides a method for authenticating a driver for driver compliance. The method includes receiving, with a base unit, an identification of a portable communication device associated with the driver; comparing, with the base unit, the identification of the portable communication device with a stored identification; and authenticating, with the base unit, the driver, if the portable communication device associated with the driver is within a configurable distance from the base unit, and if the identification of the portable communication device associated with the driver is a match with the stored identification.

Another embodiment provides a system for authenticating a driver for driver compliance. The system includes a portable communication device associated with the driver, the portable communication device having an identification. The system also includes a base unit comprising an electronic processor configured to receive the identification of the portable communication device associated with the driver, determine if the portable communication device is within a configurable distance from the base unit, compare the identification of the portable communication device with a stored identification, and authenticate the driver if the identification of the portable communication device is a match with the stored identification and the portable communication device is within the configurable distance from the base unit.

Thus, embodiments described herein, provide, among other things, methods and systems for driver authentication for complying with requirements governing the operation of commercial motor vehicles. Other aspects of the invention will become apparent by consideration of the detailed description and accompanying drawings.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
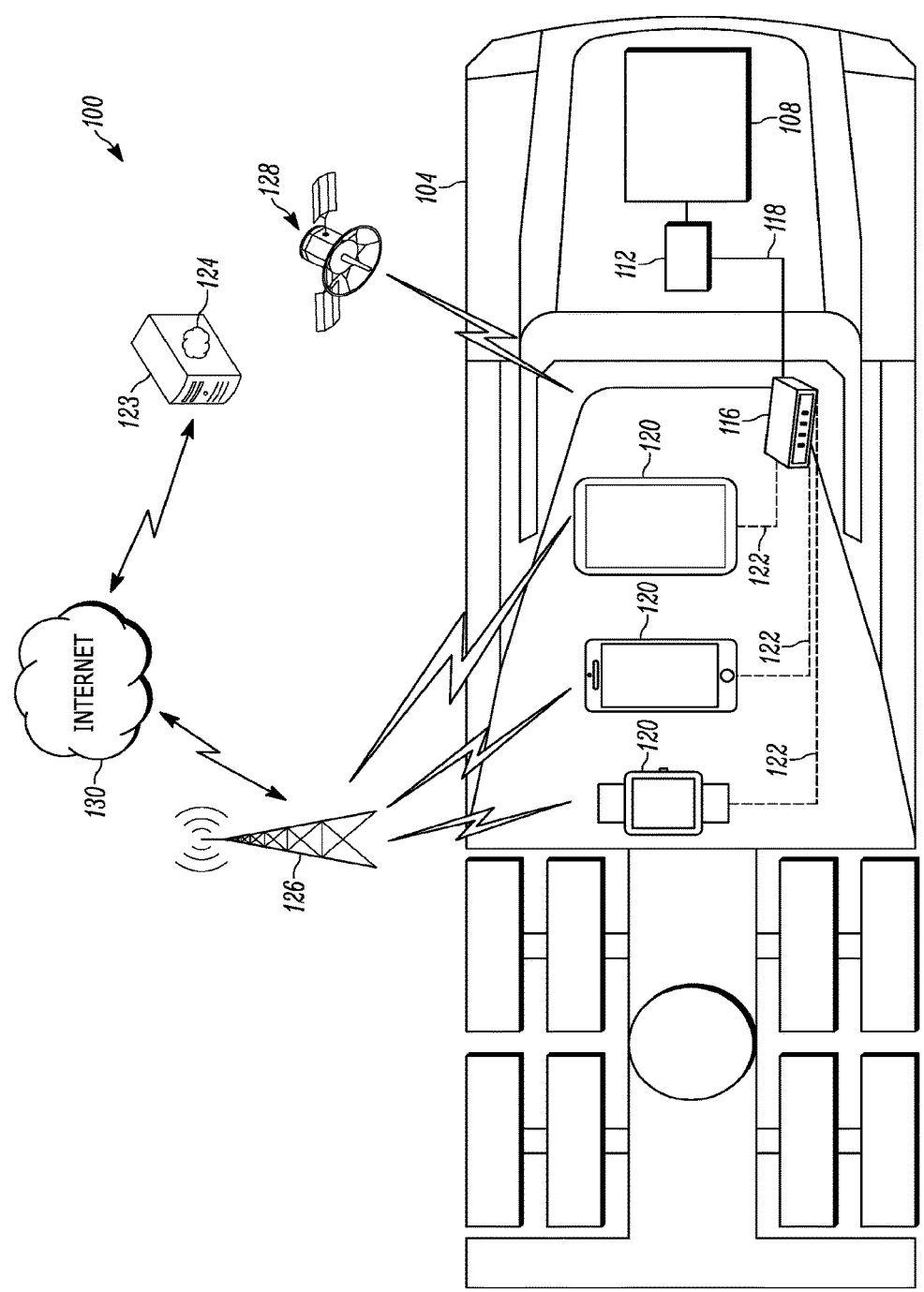
FIG. 1 schematically illustrates a driver performance monitoring system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Base units such as electronic logging devices (ELD) and electronic on-board recorders (EOBR) are used to determine the position of commercial motor vehicle (CMV). ELDs are subject to particular accuracy and availability requirements mandated by the Federal Motor Carrier Safety Administration (FMCSA). The accuracy requirements include having +/−0.5 miles absolute position of the commercial motor vehicle. The availability requirement includes detecting the commercial motor vehicle once for every 5 miles of driving.

FIG. 1 illustrates a driver performance monitoring system 100 for use with a vehicle 104. Although the vehicle 104 is illustrated as a commercial vehicle in the form of a tractor configured to tow a trailer (not shown), the driver performance monitoring system 100 can also be implemented in other types of vehicles, such as construction vehicles, agricultural equipment, and passenger vehicles. The vehicle 104 includes an engine 108 that drives the vehicle 104. The engine 108 is controlled by an electronic control unit (ECU) 112. The ECU 112 monitors operating parameters of the vehicle 104 and controls the engine 108 and other parts of the vehicle 104 based on the monitored parameters. Operating parameters monitored by the ECU 112 include speed, hours of vehicle 104 or engine 108 operation, operating status, ignition state, trip distance, total vehicle distance, and the like.

In one embodiment, the driver performance monitoring system 100 includes an electronic logging device (ELD) 116, one or more portable communication devices 120 (for example, external to the base unit 116), and a remote server 123 running a remote host application 124. As illustrated in FIG. 1, the base unit 116 communicates with the ECU 112 through a data bus 118. The data bus 118 can conform to communication standards such as Society of Automotive Engineers (SAE) J1939, SAE J1708, or other standards. The base unit 116 also communicates with the portable communication devices 120 through a wired or wireless link 122. In one embodiment, a wireless link 122 is enabled using Near Field Communications (NFC). In another embodiment, the wireless link 122 is enabled using Bluetooth. In yet another embodiment, the wireless link 122 is enabled by using a WiFi connection. For example, in some embodiments, the base unit 116 communicates with the portable communication devices 120 using short-wave radio transmissions in the Industrial, Scientific and Medical (ISM) band from 2400 to 2486 MHz (commonly referred to as Bluetooth or the Institute of Electrical and Electronics Engineers (IEEE) 802.15.1 standard).

In some embodiments, a portable communication device 120 can be a mobile communication device, such as a smart phone, a tablet computer, a laptop computer, a smart watch, a wearable device (for example a driver health monitoring device such as a fitness tracker device), or another computing device upon which software can be readily installed, that can wirelessly connect to other devices, and that can be carried and moved by a user. As illustrated in FIG. 1, when the portable communication device 120 includes a mobile communication device, the portable communication device 120 wirelessly communicated with the remote server 123 over a communication network 130 using a cellular network connection with a cellular tower 126 or the Internet (for example, using a Wi-Fi connection).

The base unit 116 performs a plurality of functions including, for example, time keeping and data logging. In one implementation, the base unit 116 records and stores vehicle data (for example, data for complying with Federal Motor Carrier Safety Administration (FMCSA) regulations). The vehicle data may include vehicle operating parameters monitored by the ECU 112.

The base unit 116 is powered via a connection to a battery (for example, a 12 volt or 24 volt vehicle battery). In some embodiments, the base unit 116 is configured to operate in a fully operational mode and a sleep mode to conserve power. When the base unit 116 is in the fully operational mode, the base unit 116 contains vehicle data received from the ECU 112. For example, data may be obtained by the base unit from the ECU 112 substantially in real-time or at a predefined frequency or interval. When the base unit 116 is communicatively coupled with the portable communication device 120, the base unit 116 may obtain data (for example, data related to positional information) from the portable communication device 120 substantially in real-time or at a predefined frequency or interval.

In some embodiments, the base unit 116 uses the positional information it holds unless the positional information present at the base unit 116 does not meet the desired accuracy or availability requirement. If the positional information available at the base unit 116 does not meet a particular accuracy and availability requirement, then the base unit 116 uses the location measurement from the mobile device for tagging hours of service (HOS) related compliance events. Use of the embodiments provided herein avoids situations where the driver of the vehicle is required to enter a manual location because of inaccurate positional information available at the base unit 116.

Figure 2:
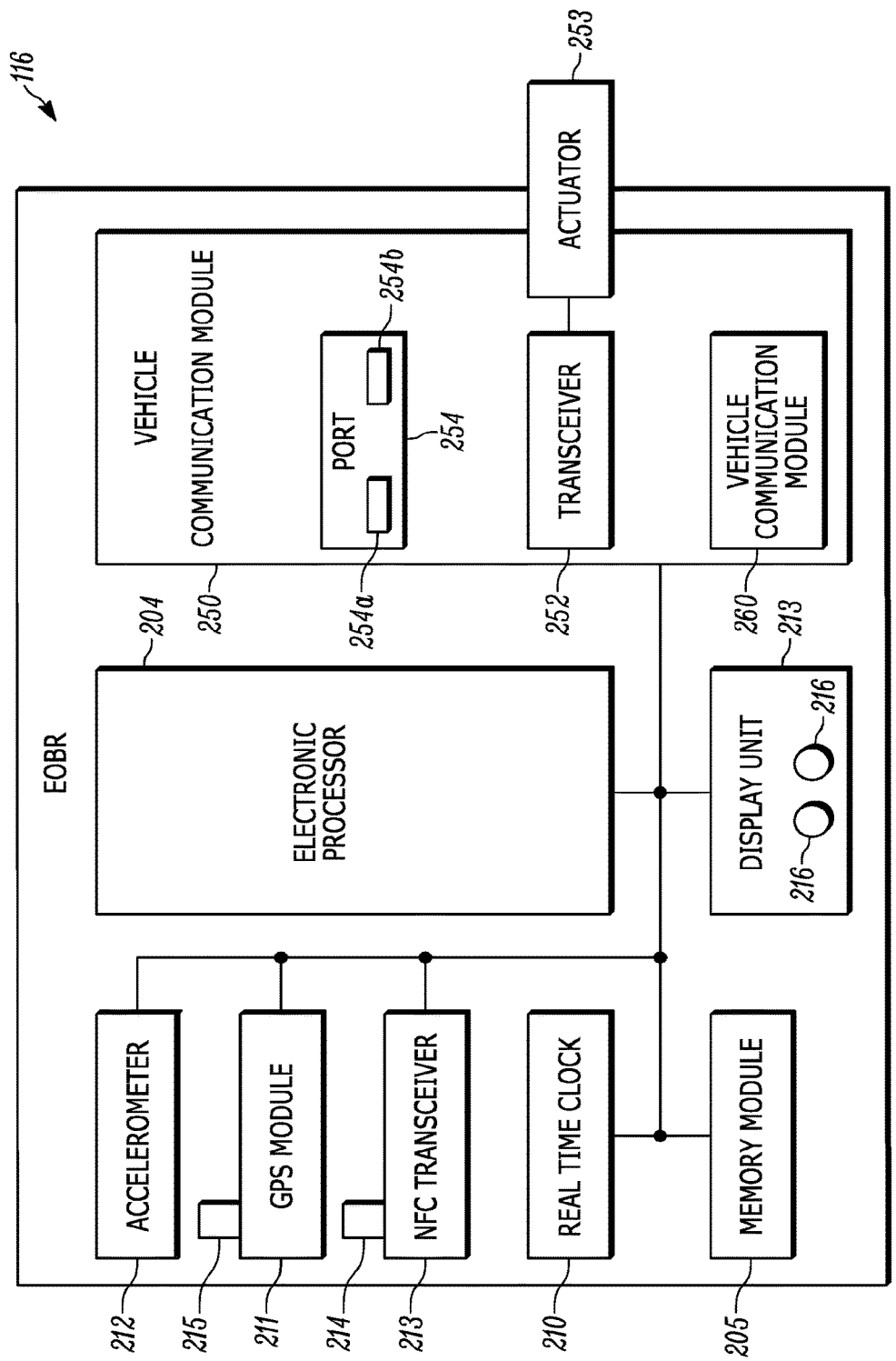
FIG. 2 is a block diagram of a base unit included in the system of FIG. 1 in accordance with some embodiments.

As shown in FIG. 2, the base unit 116 includes an electronic processor 204 (such as a microprocessor, controller, or application-specific-integrated circuit ("ASIC") and at least one memory module 205. The memory module 205 includes non-transitory computer readable medium, such as a non-volatile serial flash memory and volatile memory. As described in more detail below, the memory module 205 stores instructions that, when executed by the electronic processor 204, logs vehicle data, logs data retrieval history, and processes data received from the ECU 112 and other devices and systems external to the base unit 116. Accordingly, as described herein, the base unit 116 performs particular functionality by executing instructions with the electronic processor 204.

The base unit 116 also includes a clock 210, a source of positioning information, for example, a global positioning system (GPS) receiver or GPS module 211, an accelerometer 212, and a display unit 213. In one embodiment, the clock 210 provides a real-time clock function to allow the base unit 116 to accurately determine a time with a predetermined resolution (for example, approximately one second). The clock 210 is powered by a battery that provides power to the clock 210 even when the vehicle 104 does not provide power to the base unit 116. In some embodiments, the clock 210 is configured to obtain an updated time from the GPS module 211.

The GPS module 211 includes an antenna 215, which can be internal to the base unit 116. Positioning the antenna 215 internal to the base unit 116 makes the antenna 215 more tamper-proof than if the antenna 215 were positioned external to the base unit 116. Based on data received by the antenna 215 from one or more external satellites 128 (see FIG. 1), the GPS module 211 provides positional information to the electronic processor 204. The positional information can include GPS coordinates (e.g., latitude and longitude coordinates), a speed, a heading, a time, and a quality value. In some embodiments, the GPS module 211 updates the positional information at a predetermined frequency (e.g., approximately once per second).

The display unit 213 communicates data to a user of the base unit 116. For example, the display unit 213 can include one or more LEDs 216. The LEDs 216 indicate a status of the base unit 116. For example, the LEDs 216 can be used to indicate whether the portable communication device 120 connected to the base unit 116 is properly functioning (for example, a connection status), whether a portable communication device 120 is authenticated with the base unit 116, whether the portable communication device 120 has been denied authentication with the base unit 116, whether the portable communication device 120 has been denied access with the base unit 116, whether signals are being communicated between the base unit 116 and the ECU 112 (for example, a communication status), and whether signals are being communicated between the base unit 116 and the portable communication device 120 (for example, a mobile communication device communication status). The LEDs 216 can include different colored diodes that may be configured to flash at different frequencies to signal different statuses of the base unit 116. As an alternative to or in addition to the LEDs 216, the display unit 213 can be configured to provide data to a user through other output mechanisms, such as displaying a textual and/or graphical message, playing an audio sound or message, providing tactile feedback (for example, vibration), or a combination thereof.

The base unit 116 also includes a vehicle communication module 250. As illustrated in FIG. 2, the vehicle communication module 250 includes a transceiver 252 for communicating data between the base unit 116 and the portable communication device 120. The transceiver 252 can communicate with the portable communication device 120 using a wired or wireless connection. In one example, the base unit 116 can send data regarding the vehicle 104 and a request for positional information to the portable communication device 120 via a wireless communication channel between the portable communication device 120 and the base unit 116. In one example, the portable communication device 120 and the base unit 116 may include a transceiver 252. The transceiver 252 may be, for example, a Bluetooth Low Energy (BLE) radio device, a Near Field Communication (NFC) radio device, a WiFi radio device, or other device.

A Bluetooth-enabled device can be configured to automatically search and discover other Bluetooth-enabled devices. The base unit 116 can include a connection actuator 253 that allows a user to control when the base unit 116 becomes discoverable or searchable. For example, in some embodiments, pressing the connection actuator 253 for a predetermined period of time (e.g., three seconds) makes the base unit 116 discoverable or searchable by a Bluetooth-enabled portable communication device 120. Also, if the base unit 116 is operating in a sleep mode, pressing the connection actuator 253 wakes up the electronic processor 204 and enables communication between the base unit 116 and the portable communication device 120. In some embodiments, the base unit 116 is also configured to automatically become discoverable or searchable for a predefined period of time after the base unit 116 is powered or reset and for a predefined period of time after the base unit 116 enters a sleep mode.

When the base unit 116 is discoverable, the portable communication device 120 can search for, discover, and communicably couple to the base unit 116. In some embodiments, the base unit 116 couples to the portable communication device 120 as a slave unit. Once the portable communication device 120 is communicably coupled to the base unit 116, the display unit 213 of the base unit 116 can indicate a status of the connection or coupling. For example, when the base unit 116 is discoverable or searchable, one or more of the LEDs 216 can flash, and, when the base unit 116 is communicably coupled to the portable communication device 120, the one or more LEDs 216 can provide a solid light. After the portable communication device 120 and the base unit 116 are communicably coupled, the portable communication device 120 and the base unit 116 can exchange data. For example, as described above, the base unit 116 can transmit vehicle data to the portable communication device 120. It should be understood that even when the transceiver 264 is transmitting vehicle data to the portable communication device 120, the base unit 116 continues to monitor and record new vehicle data from the ECU 112 and other devices and systems (for example, the GPS module 211, the accelerometer 212, etc.).

As illustrated in FIG. 2, the vehicle communication module 250 also includes a port 254 for physically coupling the portable communication device 120 to the base unit 116. The port 254 allows diagnostic and other data to be transmitted between the portable communication device 120 and the base unit 116. In some embodiments, the port 254 includes one or more universal serial bus (USB) connections. For example, the port 254 can include a first connection 254a and a second connection 254b. The first connection 254a is used to transmit diagnostic data regarding the base unit 116 to the portable communication device 120 but does not provide a charging current to the portable communication device 120. Therefore, the second connection 254b is used to provide a charging current to the portable communication device 120. Therefore, the second connection 254b is used to provide a charging current to the portable communication device 120. By providing two separate connections, one for charging and one for data transmission, the base unit 116 does not need to include an isolated DC power supply.

The diagnostic data transmitted through the port 254 can relate to the base unit 116 (as compared to the ECU 112 or other components of the vehicle 104). Therefore, a user can couple the portable communication device 120 to the port 254 to diagnose a malfunction occurring with the base unit 116. Similarly, the port 254 can allow the base unit 116 to be reconfigured, modified, or upgraded using the portable communication device 120. The vehicle communication module 250 also includes a vehicle communication module 250 for communicating with the ECU 112.

Figure 3:
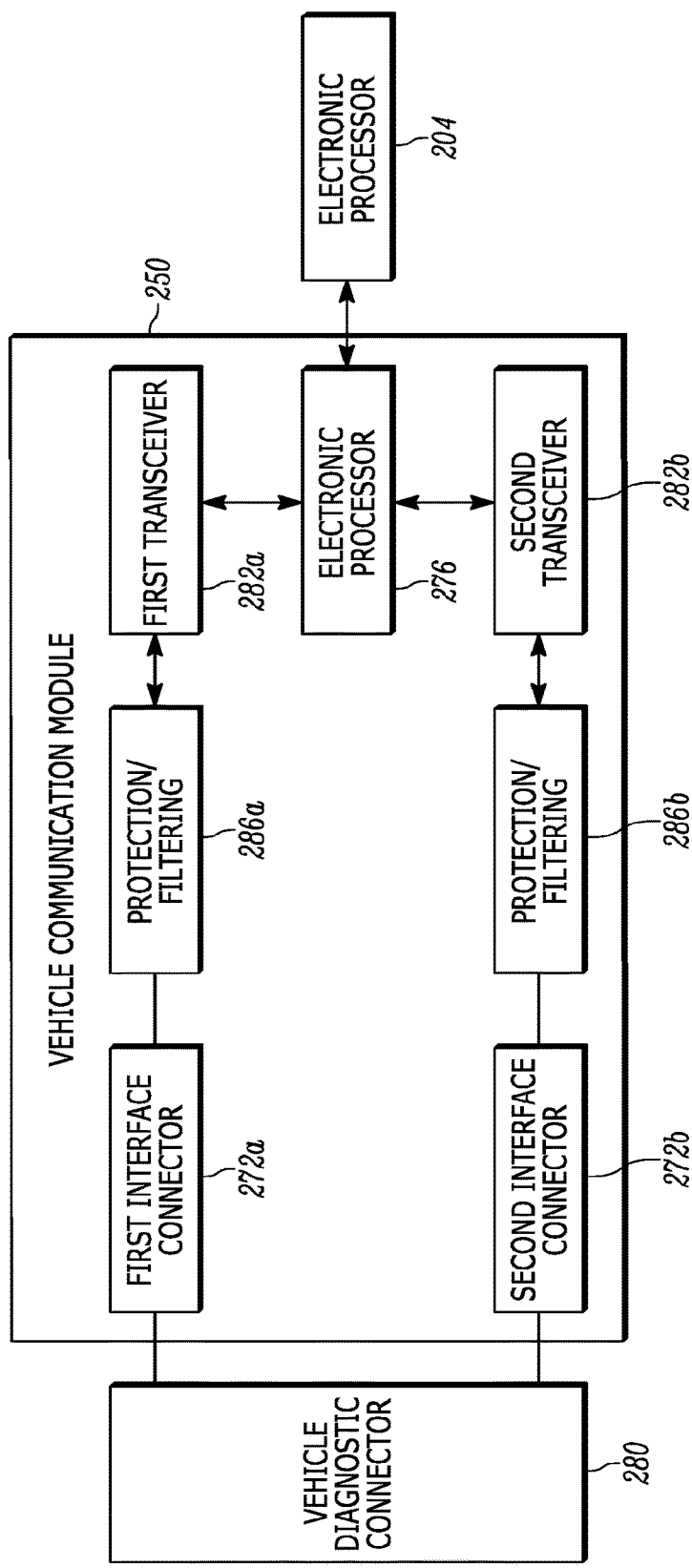
FIG. 3 is block diagram of a vehicle communication module included in the base unit of FIG. 2 in accordance with some embodiments.

As illustrated in FIG. 3, the vehicle communication module 250 includes an electronic processor 276 (such as a microprocessor, controller, or application-specific-integrated circuit (ASIC)) that, in one embodiment, is configured to manage communication between the base unit 116 and the ECU 112 and communicates with the electronic processor 204. It should be understood that, in some embodiments, the functionality provided by the electronic processor 276 is performed by the electronic processor 204 (for example, eliminating the need for a separate processing unit in the vehicle communication module 250).

To physically connect with the ECU 112, the base unit 116 includes a plurality of communication interfaces 272 to accommodate various types of vehicle data buses. For example, as described above, the ECU 112 communicates over a data bus 118, which can conform to communication standards such as SAE J1939, SAE J1708, or other standards. In some embodiments, diagnostic data is transmitted over the data bus 118. Therefore, the data bus 118 can be considered an on-board diagnostic (OBD) bus that includes a vehicle diagnostic connector 280 that allows external devices to connect to and exchange data with the data bus 118. Different types of vehicles can include different types of vehicle diagnostic connectors 280 for connecting to the data bus 118. For example, a standard passenger vehicle may include a SAE J1939 interface connector, but a commercial motor vehicle may include an SAE J1708 interface connector.

To accommodate these different connectors (and the underlying different communication standards), the base unit 116 can include a first communication interface 272a for coupling the base unit 116 to a first type of data bus 118 (for example, a SAEJ1939 bus) and a second communication interface 272b for coupling the base unit 116 to a second type of data bus 118 (for example, a SAEJ1708 bus) (see FIG. 3). It should be understood that, in some embodiments, the base unit 116 includes more than two communication interfaces 272. For example, the base unit 116 can include a SJ1708 interface, a SAE J1939 interface, a SAE J1850 interface, an international organization of standards (ISO) 9141-2 interface, an OBD-II interface, a SAEJ2284 interface, or a combination thereof. The plurality of communication interfaces 272 allows the base unit 116 to communicate with a variety of different vehicle data buses (for example, using a variety of different communication standards) and makes the base unit 116 portable in that the base unit 116 can be removed from a first vehicle and used in second vehicle even if the second vehicle does not include the same type of diagnostic bus or connector as the first vehicle.

The vehicle communication module 250 also includes at least one transceiver 282 for managing communication via the communication interfaces 272. In some embodiments, the vehicle communication module 250 includes a transceiver 282 for each interface 272. For example, as illustrated in FIG. 3, the vehicle communication module 250 can include a first transceiver 282a and a second transceiver 282b. The first transceiver 282a can conform to the communication standard associated with the first communication interface 272a (for example, SAE J1708) and can transmit and receive data through the first communication interface 272a. Similarly, the second transceiver 282b can conform to the communication standard associated with the second communication interface 272b (for example, SAE J1939) and can transmit and receive data through the first communication interface 272a. Similarly, the second transceiver 282b can conform to the communication standard associated with the second communication interface 272b (for example, SAE J1939) and can transmit and receive data through the second communication interface 272b. The two transceivers 282a and 282b can be configured to obtain the data from the vehicle diagnostic connector 280 individually or simultaneously. It should be understood that in other embodiments, the vehicle communication module 250 includes a transceiver 282 that conforms to more than one communication standard and, therefore, can communicate through more than one of the available communication interfaces 272 (for example, without the need for separate transceivers).

The vehicle communication module 250 can also include one or more protection and filtering modules 286 that filter received data to reduce or eliminate data noise. The protection and filtering modules 286 can also be configured to ensure that received data has a predetermined amplitude range that is acceptable to the electronic processor 276. Thus, amplitude surges in data can be detected and the electronic processor 276 can be protected. In some embodiments, as illustrated in FIG. 3, the vehicle communication module 250 includes a protection and filtering module 286 for each transceiver 282 (for example, a first protection and filtering module 286a and a second protection and filtering module 286b). The vehicle communication module 250 can be configured to execute one or more bus identification methods to automatically identify the data bus 118 type(s) available for communicating with the ECU 112.

Figure 4:
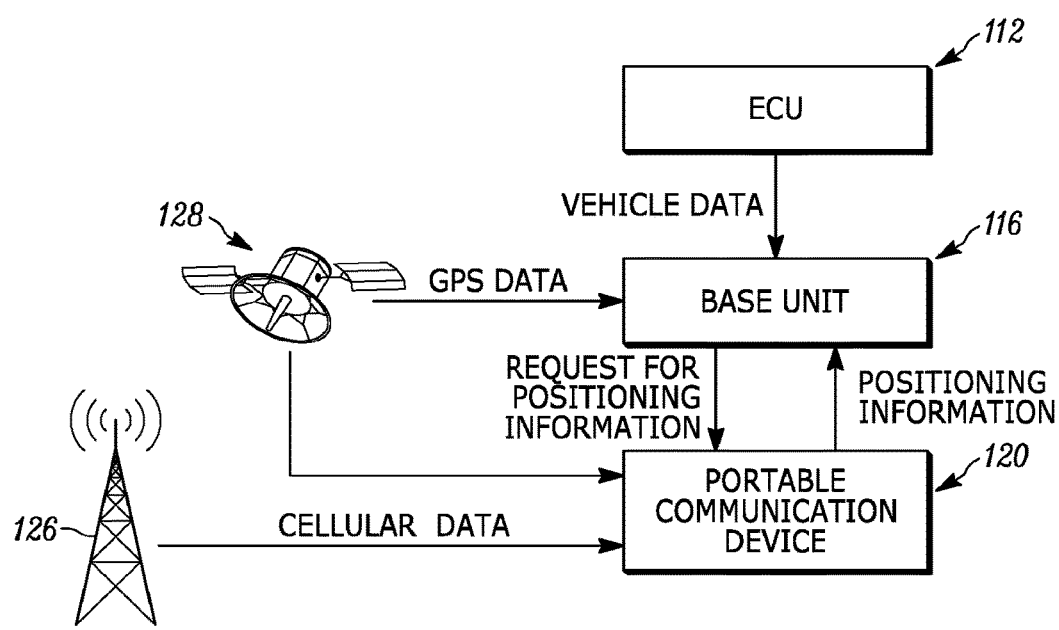
FIG. 4 illustrates data transmission using the driver performance monitoring system of FIG. 1.

FIG. 4 illustrates data transmission using the driver performance monitoring system 100, in accordance with some embodiments. As illustrated in FIG. 4, the base unit 116 receives vehicle data from the ECU 112 of the vehicle 104. Separately, the base unit 116 receives positional information (for example, GPS data) from one or more external satellites 128 via the GPS module 211. In some embodiments, the positional information includes GPS coordinates (for example, latitude and longitude coordinates), a time, and a quality value. The portable communication device 120 also receives positional information from the one or more satellites 128 via, for example, its own GPS module or receiver (not shown). In one example, the portable communication device 120 may be configured to transmit positional information it acquires or obtains to the base unit 116. In some embodiments, the base unit 116 may be configured to determine the distance between the base unit 116 and the portable communication device 120 based on the GPS coordinates associated with the base unit 116 and the portable communication device 120.

Figure 5:
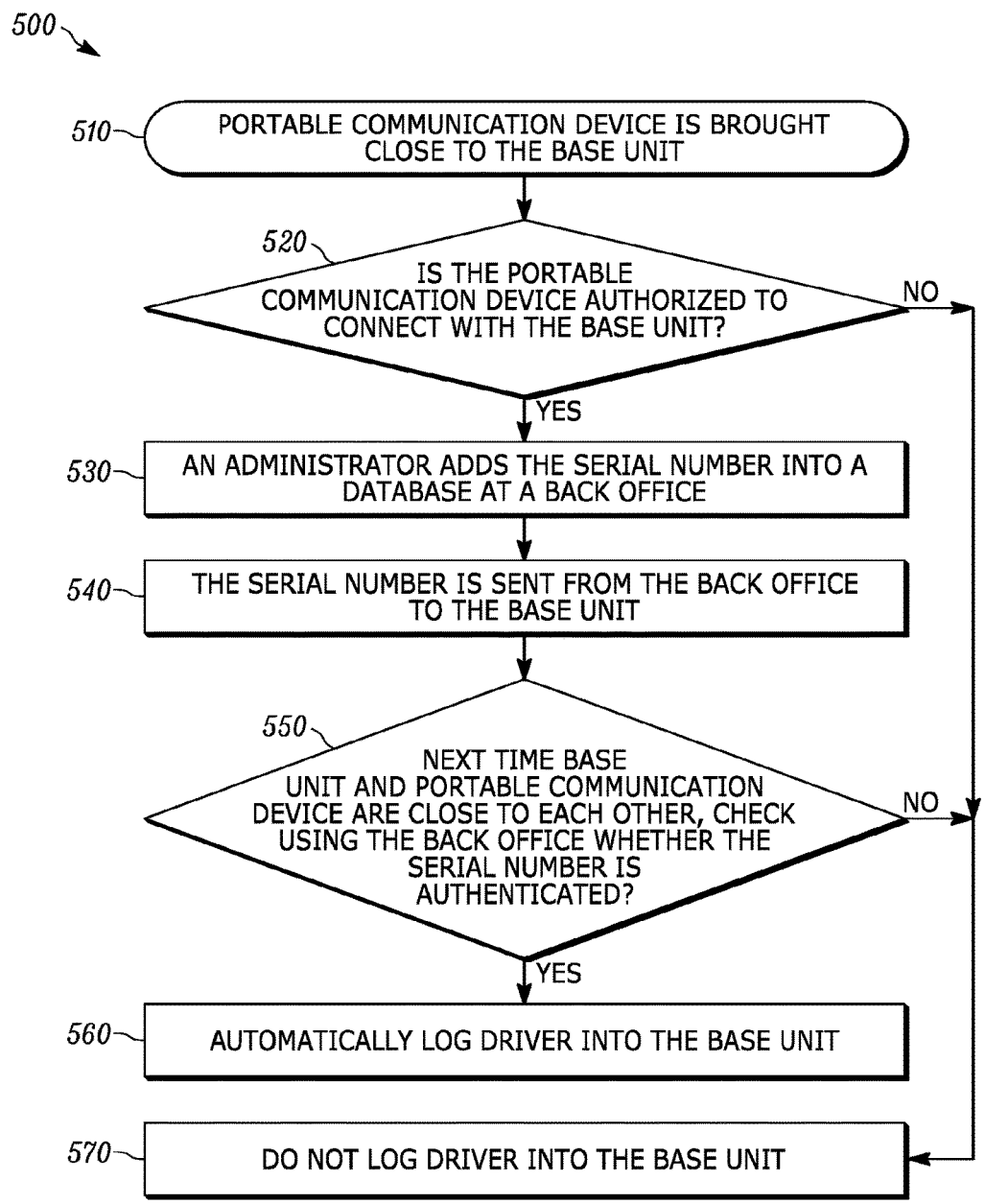
FIG. 5 is a diagram showing various steps in a method for driver authentication in accordance with an embodiment.

FIG. 5 is a diagram showing various steps in a method 500 for driver authentication in accordance with an embodiment. First, the portable communication device 120 is placed close (for example, within a configurable distance, for example, a distance that matches a signal or RF range) to the base unit 116 (block 510). In one example, the configurable distance may be defined based on a near field transmission or reception range associated with a near field communication (NFC) connection (using the NFC transceiver 213) between the portable communication device 120 and the base unit 116. In another example, the configurable distance may be allocated based on requiring the portable communication device 120 to be within a predetermined fixed distance away the base unit 116. The predetermined fixed distance may be calculated using the corresponding GPS coordinates of the portable communication device 120 and the base unit 116. At block 520, if the portable communication device 120 is authorized (based on being within the configurable distance and being recognized as an accepted device) to be associated with and configured to connect with base unit 116, then the method 500 proceeds to block 530. On the other hand, if the portable communication device 120 is not authorized to be associated with and configured to connect with base unit 116, the method 500 may proceed to block 570.

At block 530, an administrator at a back office may add the serial number or other identification or similar identification number or identifying information associated with the portable communication device 120 into a database (not shown). The method 500 further proceeds to block 540 where the serial number associated with the portable communication device 120 is sent from the back office to the base unit 116. Following which, the method 500 proceeds to block 550.

At block 550, the next time the base unit 116 and the portable communication device 120 are close to each other, the method 500 checks using the back office whether the serial number of the portable communication device 120 is authenticated. When the serial number received by the base unit 116 matches a stored serial number at the base station or at a back office, then the portable communication device 120 is authenticated. Once the portable communication device 120 is authenticated, the driver is automatically logged into the base unit (block 560). On the other hand, if the serial number of the portable communication received at the base unit 116 does not match with a stored serial number, then the driver is restricted from logging into the base unit 116 (at block 570).

Figure 6:
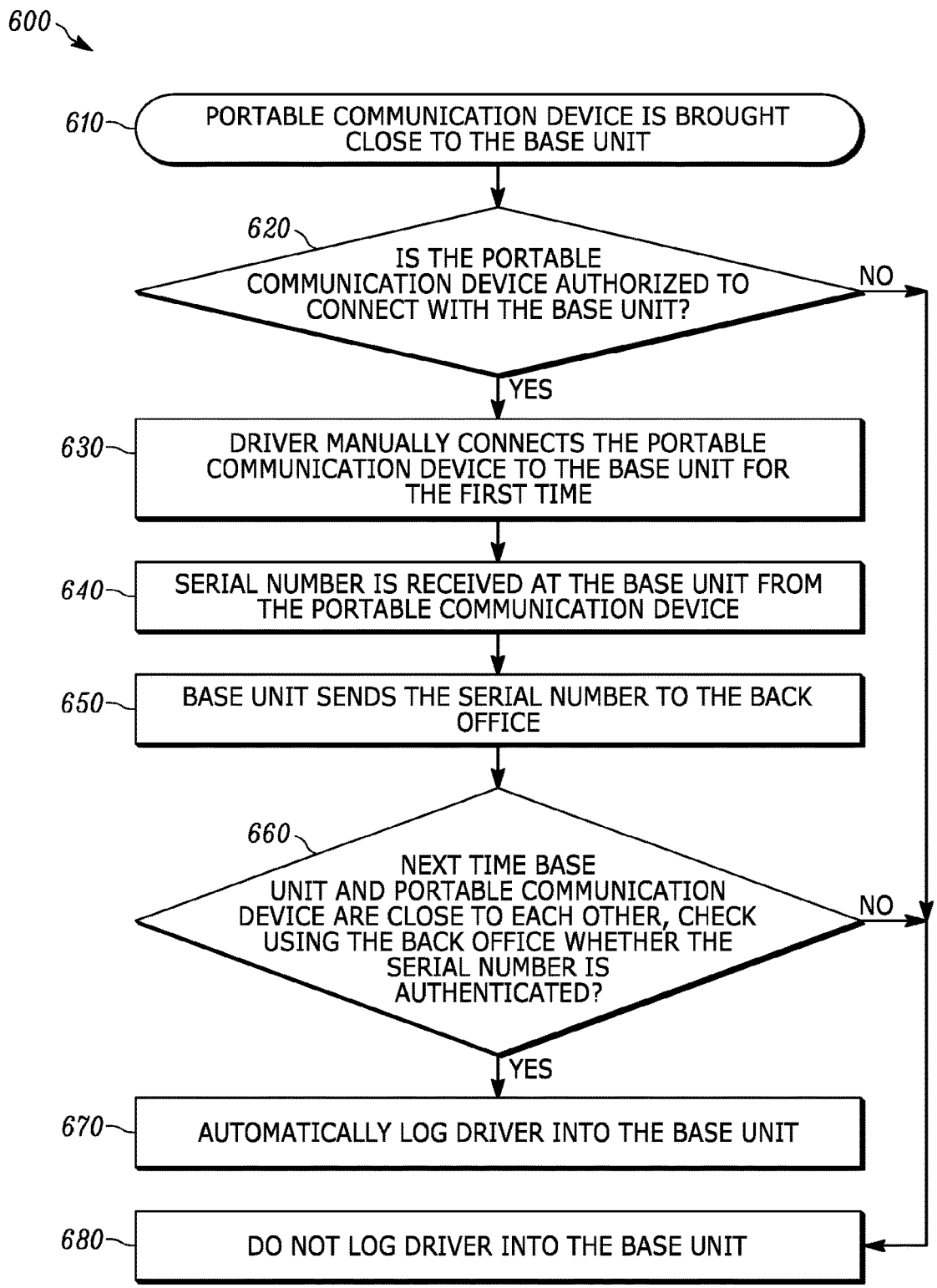
FIG. 6 is a diagram showing various steps in a method for driver authentication in accordance with yet another embodiment.

FIG. 6 is a diagram showing various steps in a method 600 for driver authentication in accordance with yet another embodiment. At block 610, the method 600 starts with having the portable communication device 120 being placed close (for example, within a configurable distance, for example, a distance that matches a signal or RF range) to the base unit 116. In one example, the configurable distance may be defined based on a near field transmission or reception range associated with a near field communication (NFC) connection between the portable communication device 120 and the NFC transceiver 213 associated with the base unit

116. In another example, the configurable distance may be allocated based on requiring the portable communication device 120 to be within a predetermined fixed distance away the base unit 116. The predetermined fixed distance may be calculated using the corresponding GPS coordinates of the portable communication device 120 and the base unit 116.

At block 620, if the portable communication device 120 is authorized (based on being within the configurable distance and being recognized as an accepted device) to be associated with and configured to connect with the base unit 116, then the method 600 proceeds to block 630. On the other hand, if the portable communication device 120 is not authorized to be associated with and configured to connect with the base unit 116, the method 600 may proceed to block 680.

At block 630, the method 600 includes having the driver manually connect the portable communication device 120 to the base unit 116. In one example, the driver may enter information related to the driver and also enter information such as a serial number of the portable communication device 120 that is associated with the driver into the base unit 116. The method 600 further proceeds to block 640 where the serial number associated with the portable communication device 120 is sent from the back office to the base unit 116. Following which, the method 600 proceeds to block 650.

At block 650, the method 600 includes having the base unit 1166 send the serial number to the back office, where it is stored in a database so that it may be verified the next time the portable communication device 120 tries to connect with the base unit 116.

At block 660, the next time the base unit 116 and the portable communication device 120 are close to each other, the method 600 checks using the back office whether the serial number of the portable communication device 120 is authenticated. When the serial number received by the base unit 116 matches a stored serial number at the base station or at a back office, then the portable communication device 120 is authenticated. Once the portable communication device 120 is authenticated, the driver is automatically logged into the base unit 116 (at block 670). On the other hand, if the serial number of the portable communication received at the base unit 116 does not match with a stored serial number, then the driver is restricted from logging into the base unit 116 (at block 680).

Figure 7:
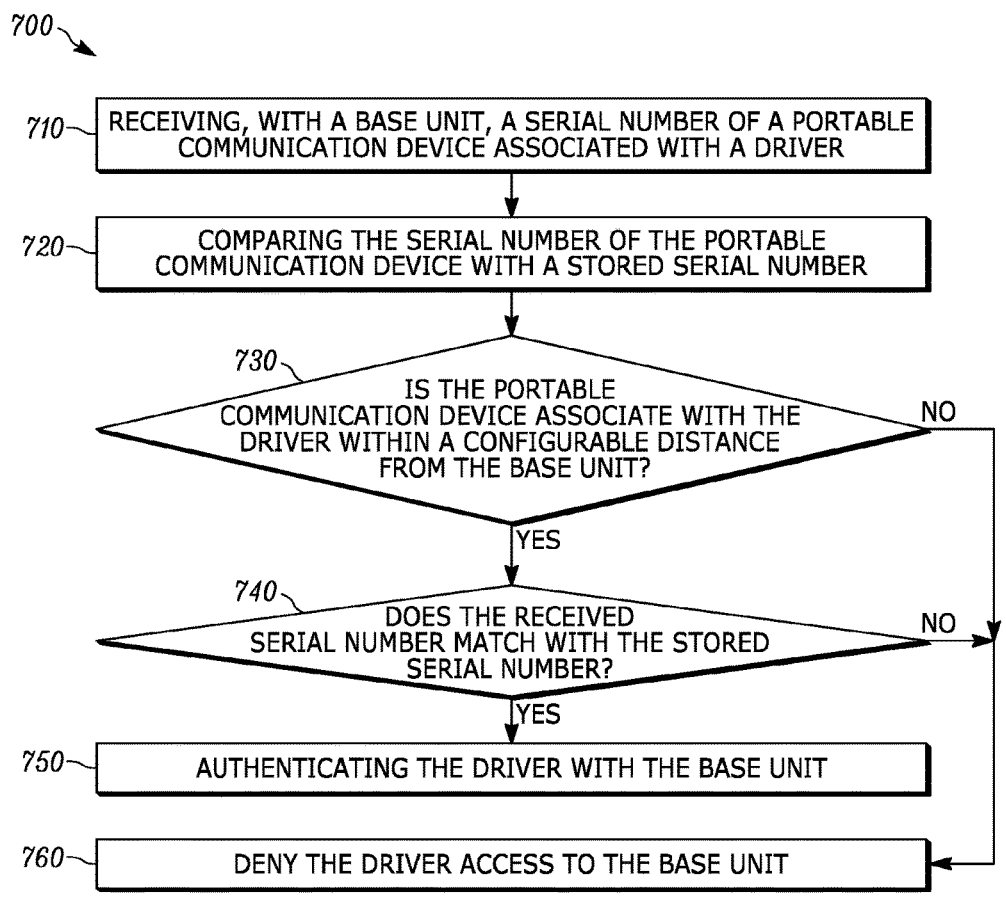
FIG. 7 is a flow chart illustrating a method for authenticating a driver for driver compliance, in accordance with some embodiments.

FIG. 7 is a flow chart illustrating a method 700 for authenticating a driver for driver compliance, in accordance with some embodiments. At block 710, the method 700 includes receiving, with base unit 116, a serial number of a portable communication device associated 120 with a driver.

At block 720, the method 700 includes comparing, with the base unit 116, the serial number of the portable communication device with a stored serial number. In some embodiments the stored serial number saved at a remote server 123 (for example, residing at a back office) using a communication network 130.

At block 730, the method 700 includes determining whether the portable communication device 120 associated with the driver is within a configurable distance from the base unit 116. In one example, the configurable distance is assigned (or predetermined) in a such a way that the driver of vehicle 104 will be unable to authenticate with a base unit 116 if the driver is at a distance greater than the configurable distance from the base unit 116. If the portable communication device 120 associated with the driver is within the configurable distance from the base unit 116, then the method 700 proceeds to block 740. If the portable communication device 120 associated with the driver is not within the configurable distance from the base unit 116, then the portable communication device 120 associated with the driver is denied access to the base unit 116 (block 760). In one example, the configurable distance is the maximum distance a portable communication device 120 associated with a driver of the vehicle 104 may be positioned from a base unit 116 to be able to authenticate itself with the base unit 116 and gain access to software within the base unit 116. In some embodiments, the configurable distance is predetermined at a back office that is in communication (using communication network 130) with the base unit 116. In one example, the configurable distance from the base unit 116 is such that it will not be greater than any of the dimensions of the vehicle 104.

At block 740, the method 700 includes determining whether a serial number (or similar identification number or identifying information) received from the portable communication device 120 is a match with the stored serial number (or identification number or identifying information) available at the base unit 116. If there is no match between the serial number of the portable communication device 120 and the stored serial number available at the base unit 116, then the portable communication device 120 is denied access to the base unit 116. On the other hand, if a match is determined between the serial number received from the portable communication device 120 and the stored serial number, then the portable communication device 120 is authenticated and allowed access to the base unit 116 (block 750). In one example, at block 750, authenticating the driver with the base unit 116 includes determining a location of the portable communication device 120 associated with the driver in relation to the base unit 116. In one embodiment, the method 700 determines a first set of global positioning satellite coordinates associated with the portable communication device 120, and determines a second set of global positioning satellite coordinates associated with the base unit 116 to calculate the distance of the portable communication device 120 from the base unit 116. In one example, the method 700 includes comparing a distance between the first set of global positioning satellite coordinates associated with the portable communication device 120 and the second set of global positioning satellite coordinates associated with the base unit 116 to the configurable distance (that may be predetermined) between the portable communication device 120 and the base unit 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for authenticating a driver for driver compliance, the method comprising:
  receiving, with a base unit, an identification of a portable communication device associated with the driver;
  comparing, with the base unit, the identification of the portable communication device with a stored identification; and
  authenticating, with the base unit, the driver, in response to the portable communication device associated with the driver being within a configurable distance from the base unit and based on the identification of the portable communication device associated with the driver being a match with the stored identification.

2. The method of claim 1, wherein authenticating the driver further comprises:
  determining a location of the portable communication device associated with the driver in relation to the base unit.

3. The method of claim 2, wherein determining the location of the portable communication device associated with the driver in relation to the base unit includes:
  determining a first set of global positioning satellite coordinates associated with the portable communication device, and
  determining a second set of global positioning satellite coordinates associated with the base unit.

4. The method of claim 3, further comprising:
  comparing a distance between the first set of global positioning satellite coordinates and the second set of global positioning satellite coordinates to the configurable distance of the portable communication device from the base unit.

5. A base unit, the base unit comprising:
  an electronic processor configured to
  receive an identification of a portable communication device associated with a driver,
  determine if the portable communication device is within a configurable distance from the base unit,
  compare the identification of the portable communication device with a stored identification, and
  authenticate the driver in response to the portable communication device associated with the driver being within a configurable distance from the base unit and based on the identification of the portable communication device associated with the driver being a match with the stored identification.

6. The base unit of claim 5, wherein the electronic processor is further configured to
  receive the identification of the portable communication device via a wireless communication channel between the portable communication device and the base unit.

7. The base unit of claim 6, wherein the electronic processor is further configured to
  determine a location of the portable communication device associated with the driver in relation to the base unit.

8. The base unit of claim 7, wherein the electronic processor is further configured to determine a first set of global positioning satellite coordinates associated with the portable communication device, determine a second set of global positioning satellite coordinates associated with the base unit, and compare the first set of global positioning satellite coordinates and the second set of global positioning satellite coordinates.

9. The base unit of claim 8, wherein the electronic processor is further configured to compare a distance between the first set of global positioning satellite coordinates and the second set of global positioning satellite coordinates to the configurable distance of the portable communication device from the base unit.

* * * * *